United States Patent [19]
Holmes

[11] Patent Number: 5,760,731
[45] Date of Patent: Jun. 2, 1998

[54] SENSORS AND METHODS FOR SENSING DISPLACEMENT USING RADAR

[75] Inventor: David W. Holmes, Georgetown, Tex.

[73] Assignee: Fisher Controls International, Inc., Clayton, Mo.

[21] Appl. No.: 574,617

[22] Filed: Dec. 19, 1995

[51] Int. Cl.⁶ .................................................. G01S 13/00
[52] U.S. Cl. ...................................... 342/118; 342/61
[58] Field of Search ........................ 342/61, 118, 193, 342/28, 21; 73/660; 310/328

[56] References Cited

U.S. PATENT DOCUMENTS

| | | | |
|---|---|---|---|
| 4,210,399 | 7/1980 | Jain | 356/28.5 |
| 4,352,039 | 9/1982 | Hagood et al. | 310/328 |
| 4,375,057 | 2/1983 | Weise et al. | 342/61 |
| 4,507,658 | 3/1985 | Keating | 343/12 R |
| 4,673,003 | 6/1987 | Goede | 139/342 |
| 4,715,563 | 12/1987 | Quamen | 244/152 |
| 4,723,448 | 2/1988 | Veligdan | 73/657 |
| 4,757,745 | 7/1988 | Taplin | 342/61 |
| 4,787,396 | 11/1988 | Pidorenko | 128/667 |
| 4,887,087 | 12/1989 | Clearwater | 342/61 |
| 4,893,125 | 1/1990 | May | 342/129 |
| 4,945,768 | 8/1990 | Sorrells | 73/703 |
| 5,113,194 | 5/1992 | Krikorian et al. | 342/106 |
| 5,229,774 | 7/1993 | Komatsu | 342/70 |
| 5,266,954 | 11/1993 | Orlowski et al. | 342/69 |
| 5,268,692 | 12/1993 | Grosch et al. | 342/70 |
| 5,428,359 | 6/1995 | Yoneyama et al. | 342/70 |
| 5,465,094 | 11/1995 | McEwan | 342/28 |
| 5,479,826 | 1/1996 | Twerdochlib et al. | 73/660 |
| 5,565,872 | 10/1996 | Prevatt et al. | 342/193 |

FOREIGN PATENT DOCUMENTS

| | | |
|---|---|---|
| 0 535 780 A1 | 4/1993 | European Pat. Off. . |
| 43 42 288 A1 | 6/1995 | Germany . |

Primary Examiner—Daniel T. Pihulic
Attorney, Agent, or Firm—Wolf, Greenfield & Sacks, P.C.

[57] ABSTRACT

A sensor for sensing a displacement in a mechanical system using radar utilizes a miniaturized radar transceiver formed, typically, on a silicon chip. The transceiver is mounted to a fixed surface that senses a displacement of a moving surface. The moving surface is typically located in mechanical communication with a system to be sensed. By using appropriate translating circuitry, an accurate determination of the nature of displacement of the mechanical system can be made. Mechanical systems sensed can include rotating and sliding components such as motors, valves and pressure gauges. Sensors according to this invention are highly accurate and reliable.

43 Claims, 6 Drawing Sheets

SENSORS AND METHODS FOR SENSING DISPLACEMENT USING RADAR

FIELD OF INVENTION

This invention relates to sensors that use a miniaturized radar to determine changes in displacement and acceleration of sensing components.

BACKGROUND OF INVENTION

It is desirable in remote sensing applications to obtain quick and accurate readings of changes in speed, position and pressure in fluid and mechanical systems. Accurate sensor readings are particularly important in the field of process control where many system components may be combined at different times or in different amounts, to generate a desired finished product. For example, fluid flow rates should be measured continuously to ensure that accurate amounts of fluid are delivered. Fluid pressures should be accurately controlled to ensure that system components are not overloaded, and that appropriate process conditions are maintained. Equipment should be constantly monitored for vibration and displacement to ensure proper function, and to guard against dangers such as fluid cavitation. The relative positions of valves should be continuously monitored.

Prior art sensing devices have often relied upon mechanical transducers and potentiometers interconnected with movable sensing elements to generate electronic sensing signals. Such signals are fed to a human-operated control panel or computer controller that monitors the process. A disadvantage of these electro-mechanical transducers and potentiometers is that they are prone to inaccuracies, due to calibration errors, wear and calibration drift over time. In addition, these electromechanical systems have innate inertias that may make them slow to respond to rapid changes and that introduce added frictions that may obscure accurate sensing results, particularly when small changes are present. Finally, electromechanical sensing systems, with several moving components, are less reliable, particularly in rough environments than more-solid-state systems with fewer added moving components.

It is, therefore, an object of this invention to provide sensing elements for a variety of applications that sense displacement and acceleration of mechanical components using non-contacting sensors with fewer moving parts and improved reliability. The sensors should be applicable to a variety of systems, including those employed in process controls for controlling and measuring the flow of fluids. The sensors should, additionally, be adaptable to a variety of mechanical systems outside of the process control field. Such sensors should be sturdy, have long life and measure small changes in displacement and acceleration with improved accuracy and speed.

SUMMARY OF INVENTION

This invention overcomes many of the disadvantages of the prior art by providing an accurate and reliable sensing device using a newly-developed miniaturized radar transceiver that can be formed, preferably, on a microchip. Using such a radar, a moving component can be sensed free of any actual contact with the component. The resulting radar, therefore, has fewer moving parts and enables more accurate sensing of small displacements in moving parts.

According to one embodiment of the invention, a sensing device includes a fixed surface having a miniaturized radar transceiver mounted thereon. The transceiver faces a moving component and transmits a radar beam to the moving component. The moving component can include an irregular surface shape so that a relative distance between a portion of the surface and the radar chip changes as the component moves. The moving component is typically interconnected with a mechanical system driven by rotation, translation, fluid pressure or vibration or a combination of movements. The underlying movement of the system can be accurately tracked using a translating circuit that is calibrated to determine the nature of the particular movement.

A rotational component, such as a shaft, can be monitored by providing a gear or cam structure that changes shape as the shaft rotates. Such a shaft can be attached to a valve, motor or other rotating mechanical system.

A linear component, such as a linear shaft, can include a ramp structure or other irregular surface that, again, varies in spacing from the radar transceiver based upon linear movement. Such a structure can be mounted on a linear actuator for a valve or any other system in which linear movement occurs.

A miniaturized radar transceiver chip can be positioned relative to a shaft and can be used to sense vibration in the shaft as it rotates. The translating circuit can be calibrated to generate a signal when a maximum allowable vibration has been exceeded. In this embodiment, the translating circuit can be used to alert an operator to excess bearing wear or imminent equipment failure. In another embodiment, a radio transceiver can be positioned relative to a diaphragm or tube that moves in proportion to an applied fluid pressure. The translating circuit can be used to equate a given movement of the diaphragm or tube with a given pressure change to provide an accurate and reliable system for monitoring pressure without any direct mechanical interconnection between the pressure-actuated member and the sensing component.

Using the methods and devices described herein, a wide range of devices and systems having moving components can be monitored accurately, at low cost and with high reliability.

BRIEF DESCRIPTION OF THE DRAWINGS

The foregoing and other objects and advantages of the invention will become more clear with reference to the following detailed description as illustrated by the drawings in which.

DETAILED DESCRIPTION

Radar has long been recognized for its ability to accurately determine distances, speeds and accelerations of remote objects with a high level of accuracy and reliability. The term "radar", as used herein, is meant to describe a group of transmitted and received radio frequency signals, typically in the microwave frequency band. These signals are reflected from objects and the reflected waves are received by a radar receiver which translates, using known electronics, the signals into a representation of shape, size, distance and displacement of the object.

Prior art radar and microwave transceiver devices have been limited in application, to a large extent, by size and cost constraints. Most microwave units, regardless of their level of power transmission, have been relatively large. While substantial miniaturization of radar transceivers has occurred over the years, the smallest units have remained several centimeters to inches in size and have been relatively expensive. However, recent advances in radar technology have, however, substantially reduced the size and cost of radar transceivers. In particular, the Lawrence Livermore National Laboratories in Livermore, Calif., have now introduced a radar unit, consisting of a transmitter and receiver formed on a silicon circuit chip, hence, a full-function radar is now available in a package, the size of a standard computer microchip. This package can include all the circuitry necessary to generate a meaningful output as to a remote object's speed, acceleration, size, shape and distance. The chip can be manufactured by integrated circuit manufacturing techniques and, according to principal inventor, Tom McKuen, can be manufactured en masse for a unit cost of one dollar or less. As used herein, a radar transceiver chip formed using integrated circuit techniques or a similarly compact radar unit shall be referred to as a "miniaturized radar transceiver" or "transceiver chip". This chip, as currently constructed, outputs on approximately one-millionth of one watt of signal power, at a frequency of approximately one megahertz.

Figure 1:
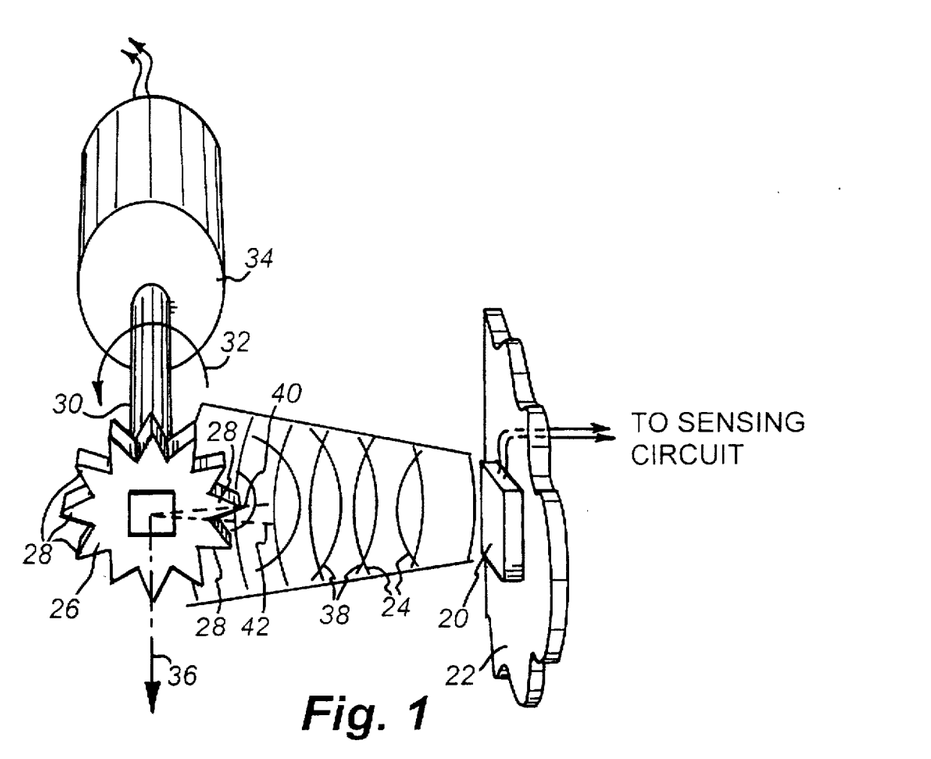
FIG. 1 is a schematic perspective view of a rotational displacement sensing system according to one embodiment of this invention.

Reference is now made to FIG. 1 which describes a basic application for a radar transceiver chip 20 mounted on a fixed surface 22. An incident radar beam 24 is directed from the chip 20 to a gear-like wheel or gear 26 having teeth 28. The wheel is mounted to a shaft 30 that, in this embodiment is rotated (curved arrow 32) by a motor 34 about an axis of rotation 36. The gear 26 can be sized in a very broad range, from a few millimeters in diameter to several feet, or more. As further described below, the limitations of size are based largely upon the sensitivity of the radar transceiver chip 20. Likewise, while the gear 26 is rotated by a motor 34, it is contemplated that any rotational motive force can be utilized including, intermittent and bi-directional rotational drivers.

The gear teeth 28 define a non-continuous surface on the gear 26. That is, the teeth vary in distance for the rotational axis 36 at differing point about the circumference of the gear 26. In the case of the depicted gear wheel, each tooth is roughly identical and, therefore, the distance of any given point of the teeth 28 from the rotational axis 36 is periodic about the entire circumference. The incident signal 24 of the radar transceiver chip 20 will generate a reflected signal 38 that varies depending upon the location of the teeth 28 relative to the transceiver chip 20. In other words, as the gear 26 rotates, the "picture" presented by the teeth to the radar (via the reflected waves 38) varies. As depicted, the radar is centered upon a point 40 (the peak of a tooth 28) at the current time. At a second time, the gear rotates so that point 42 (the trough between two gear teeth 28) is then centered relative to the radar transceiver chip 20. A different picture will be presented by point 42 than by point 40. This process occurs continuously as all points between first point 40 and second point 42 pass through the beam. In this particular embodiment, the sensor 20 is presented with a periodically repeating series of distance measurements as each gear tooth 28 passes through its beam. Using known differentiation circuits, the passage of each of the teeth 28 can be used to accurately gauge the speed and acceleration of the gear wheel 26. Knowing the number of teeth on the gear, and its size, allow quick calculation of its angular and tangential velocity using this sensing technique. Likewise, an initial calibration of the sensor to a known speed can be used to translate subsequent variations in speed that occur in direct proportion to the known speed.

While a continuous gear 26 is shown and described in FIG. 1, a partial gear-like wheel can be substituted. Appropriate changes in the sensing software and circuitry can be made to perform a periodic count of gear tooth movements. In fact, only one gear tooth need be provided to an otherwise continuous shape to sense speed and acceleration. In some applications, this could be preferable since there always tend to be slight variations in gear size and the sensing technique described according to this invention is highly accurate, capable of measuring changes in distance to within a few thousandths of an inch, or less. It is desired primarily that at least one known surface variation pass through the incident sensing beam 24 so that a "picture" of the moving surface can be obtained by the reflected beam or can be deflected back to the transceiver chip 20.

Figure 2:
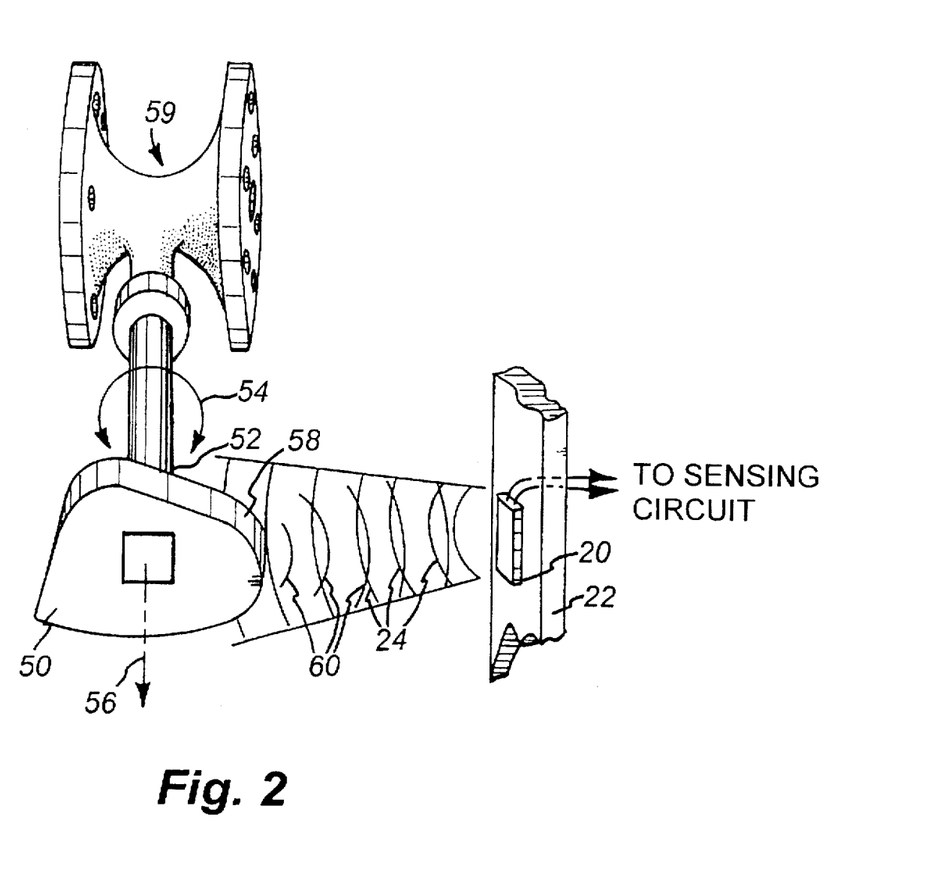
FIG. 2 is a schematic perspective view of an alternate embodiment of a rotational displacement sensing system according to an alternate embodiment of this invention.

FIG. 2 illustrates a continuous surface in the form of a cam 50 mounted on a shaft 52 that rotates bi-directionally (curved arrow 54) about a central axis of rotation 56. In this embodiment, the shaft 52 interconnects with a control valve 59 that can comprise any rotationally-activated valve, such as a one-half turn, one-quarter turn, or butterfly valve. The cam 50 of this embodiment defines an outer surface 58 that varies substantially continuously in distance relative to the central rotational axis 56. Hence, points along the outer surface 58 will present a different distance picture to the transceiver chip 20 via the reflected beam 60. Hence, as the shaft 52 is rotated, the cam 50 presents a minutely different picture to the transceiver 20 at each point of rotation. This data can be used to accurately determine the rotational orientation of the shaft 52 and, hence, the exact state of the gate (not shown) of the valve 59. Likewise, the speed at which the gate opens or closes can be determined through differentiation of changes in distances of the cam outer surface 50 from the transceiver 20. The system of FIG. 2, therefore, enables highly accurate control and placement of the rotating shaft 52. The transceiver 20 can be interconnected with manual or automatic readouts and controls to enable highly accurate control of a valve or other rotationally-actuated component.

It should be clear that the systems described in FIGS. 1 and 2 can be incorporated into a sealed package and that the distance between the moving sensed component (gear wheel 26 or cam 50) and the transceiver 20 can be varied to suit particular packaging requirements. In other words, the sensor can be placed very close to the sensed component or, alternatively, can be placed at a distance of several inches away, if necessary.

Additionally, while a continuous cam 50 is detailed in FIG. 2, it is contemplated that a surface that varies over only part of its circumference can be provided where appropriate or that the surface can be provided with step increases and decreases in distance where less-accurate variation of rotational position is desired. In summary, the systems described in FIGS. 1 and 2 can be applied to any mechanical system in which a rotation of an object or shaft must be accurately tracked for position, speed and acceleration.

Figure 3:
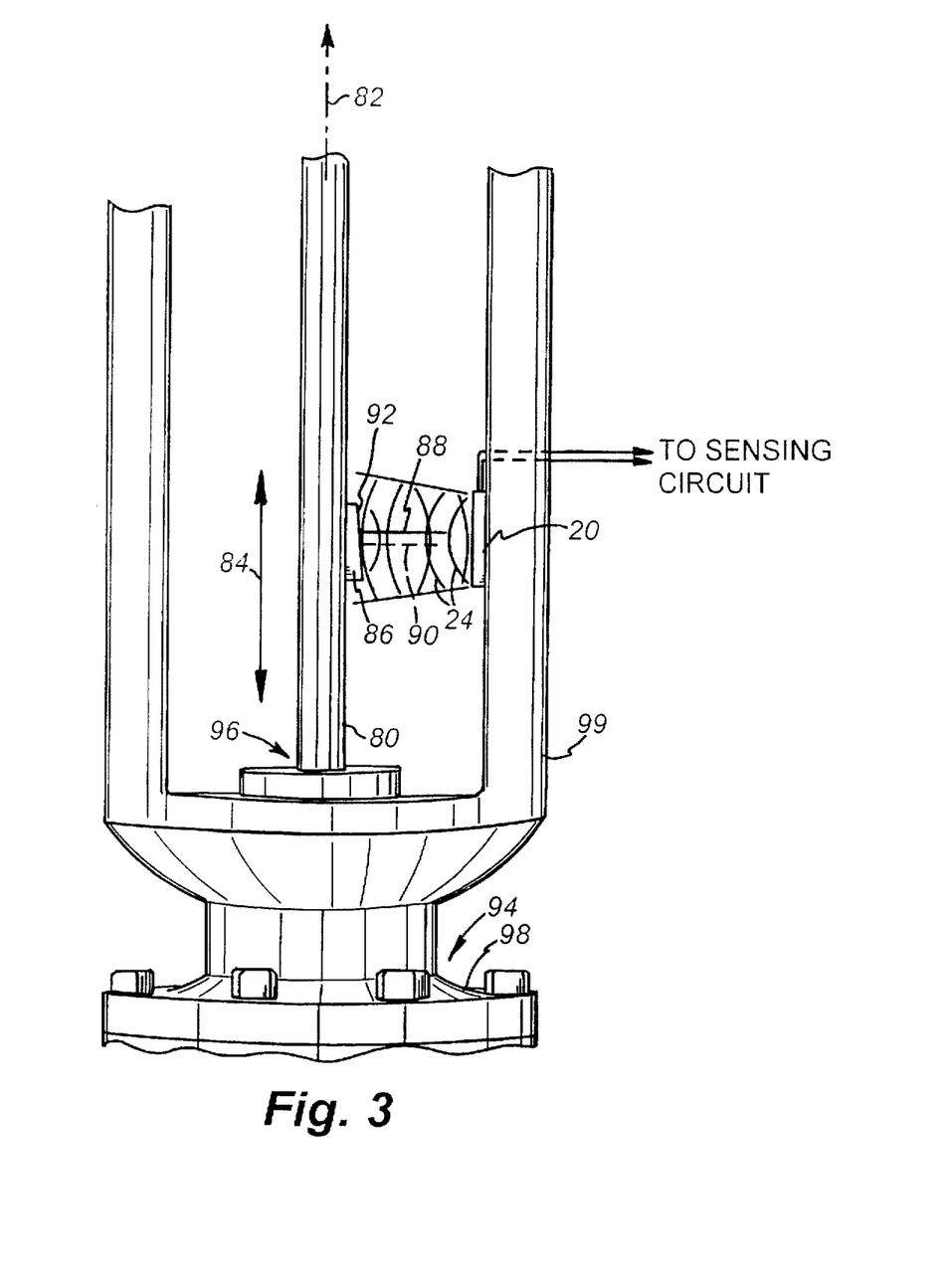
FIG. 3 is a schematic perspective view of a linear displacement sensing system according to one embodiment of this invention.

FIG. 3 illustrates an embodiment of the sensing system according to this invention. The microchip-based miniaturized radar transceiver 20 is, again, fixed to a stationary surface 99 which, in this embodiment, is a valve-stem guide frame member. It transmits incident radar waves 24 in the direction of a shaft 80 that is part of a valve stem 96 described further below. The shaft 80 is centered about an axis 82. While the shaft 80 shown in this embodiment and the preceding embodiments is round, a square, hexagonal or asymmetrical shaft can be substituted. In this embodiment, the shaft moves linearly (double arrow 84) along the central axis 82. In this particular embodiment, however, rotation of the shaft 80 is not generally contemplated. A ramp structure 86 is provided at a location on the shaft that falls within the incident beam 24 generated by the chip 20. In the illustrated embodiment, a point 88 is centered within the beam 20. As the shaft moves, for example, upwardly, another point 90 can become centered within the beam 24. Since the ramp 86 includes a surface 92 that is sloped, the distance of the surface 92 from the chip 20 varies in proportion to linear movement (double arrow 84) of the shaft 80 along the axis 82. In other words, the point 88 is further away from the chip 20 than the axially-lower point 90. This change in distance can be used to accurately determine the axial location of the shaft relative to the chip 20 and fixed surface 22.

The ramp 86 need not be formed as an extension of the shaft 80 but, rather, can be formed as an integral part of the shaft. Likewise, it can be provided to the entire circumference of the shaft so that rotation and axial movement are also possible. In fact, a surface that has both axially-sloped and circumferentially varying (such as cam 50 in FIG. 2) proportions can be provided. In this manner, both axial translation and rotational translation can be sensed simultaneously. It is important primarily that the distance of a given portion of the shaft from the central axis 82 vary as axial movement of the shaft (double arrow 84) occurs.

As noted above, the shaft 80 is interconnected with a valve 94 having a gate (not shown) that is actuated by axial movement of the valve stem 96 relative to the valve housing 98. It is contemplated that any axially-actuated component, or component in which axial displacement must be determined and tracked, can be substituted for the valve 94. Like the other embodiments described herein, a known sensing circuit (not shown) can be interconnected with the chip 20 to translate displacement data into usable information regarding the condition of the axially-actuated component. In the case of valves and/or process control devices, the data can be used to maintain a given valve setting using a computer monitored feedback loop or a similar circuit arrangement. Likewise, data can be used to monitor the current state of a valve or other component and to enable an operator to change the state, while receiving information of any new setting on demand. The circuitry need only be calibrated, using known techniques, to provide the operator or control computer with desired data on a given axially-actuated component.

Figure 4:
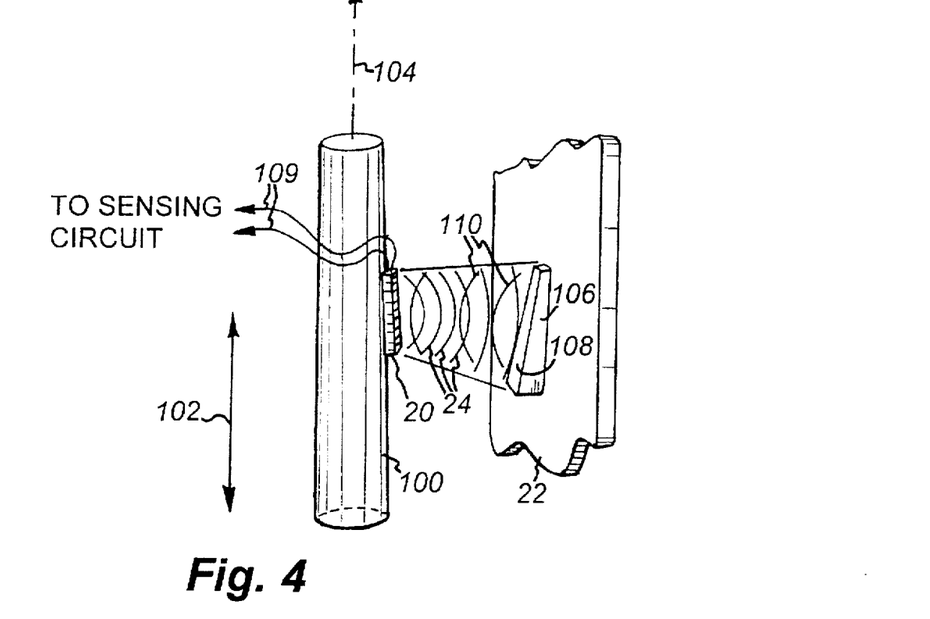
FIG. 4 is a schematic perspective view of a linear displacement sensing system according to an alternate embodiment of this invention.

FIG. 4 illustrates an alternate embodiment of the axial motion-sensing embodiment of FIG. 3. A shaft 100, interconnected with any appropriate axially-moving component, is arranged to translate (double arrow 102) along a central axis 104. A radar transceiver chip 20 is fixedly attached to the shaft 100. As in the other embodiments, lead wires 109, or other acceptable data-transmission conduits 108 are interconnected with an appropriate sensing circuit. The chip 20 can be attached to a pre-formed base (not shown) on the shaft 100, or the chip 20 can be, simply, adhered to the shaft using appropriate adhesives in a manner similar to that used for adhering strain gauges to mechanical components. A fixed wall 22 is located adjacent to the shaft 100. In this embodiment, the fixed wall includes a ramp structure 106 having a sloped face 108 that varies in distance from the shaft center axis 104 along the axially direction (double arrow 102). As the shaft 100 moves axially (double arrow 102) the incident beam 24 of the chip 20 becomes centered on different axially-oriented points of the sloped surface 108. Accordingly, the reflected beam 110 transmits a continuously differing reading of distance of the shaft 100 relative to the sloped surface 108 as the shaft moves axially. Like the embodiment of FIG. 3, this difference can be used to determined the relative axial location of the shaft 100, its acceleration and speed of displacement. Note that the ramps 86 and 106 of FIGS. 3 and 4, respectively, can be provided with continuously-sloped surfaces (92 and 108, respectively) or can be provided with stepped surfaces where less accurate measurement is desired.

Figure 5:
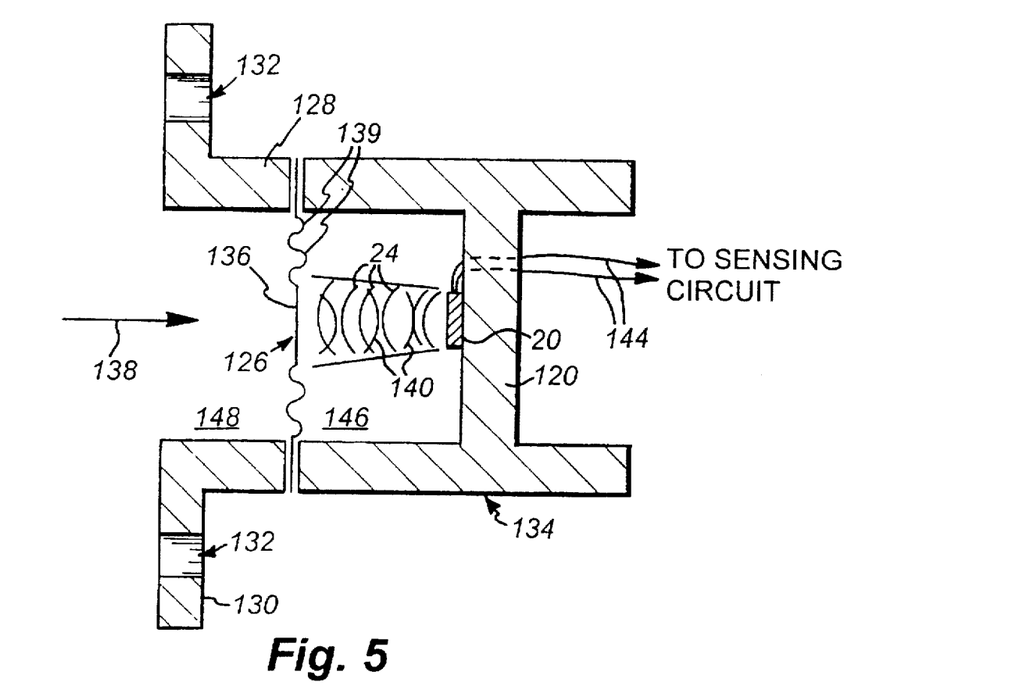
FIG. 5 is a schematic perspective view of a pressure sensing system according to one embodiment of this invention.

The concepts described herein can also be applied to the displacement of nonshaft-like components. FIG. 5 illustrates the use of a sensing transceiver chip 20 according to this invention on a wall 120 of a fixed housing 134 directed against a diaphragm 126 disposed between the housing 134 and a base member 128. The base member 128 in this embodiment can comprise a pipe fitting having a flange 130 with bolt holes 132 so that the base member 128 can be secured to a pipe or fluid-carrying component. The fluid can comprise liquid or gas. The diaphragm 126 defines a flexible member formed from thin metal, polymer or another material that enables the central portion 136 of the diaphragm 126 to translate toward and away from the chip 20 upon application of pressure (arrow 138). The diaphragm can be square or polygonal in outer perimeter or, as shown, can be circular. In this embodiment, a series of concentric undulations 139 are provided to facilitate movement of the center section 136 toward and away from the chip 20.

The center section 136 of the diaphragm 126 reflects incident radar beams 24 to generate reflected beams 140 that indicate the relative distance of the center section 136 from the chip 20 at a given time. This distance is, itself, based upon deflection of the diaphragm due to pressure (arrow 138) exerted within the base section 128. The diaphragm is strong enough to resist the strongest pressure predicted for a given fluid system. The material from which the diaphragm 126 is constructed should have sufficient resilience and elasticity to move within the predicted range of pressures without permanent deformation or long term creep under normal usage. Likewise, the diaphragm 126 should be constructed so that a sufficiently large range of movement is obtained within the operating range of pressures so that the movement is within the sensing tolerance of the chip 20. In fact, the tolerance of the chip 20 enables sensing of displacement to within a few thousandths of an inch or less. Thus, a very small range of diaphragm movement is actually required under most operating conditions. Note that the sensor can be located on the diaphragm 126 and move relative to the fixed surface 120 similar to the embodiment of FIG. 4.

By providing known sensing circuits in communication with the chip 20 (via, for example, wires 144), the actual pressure and/or the rate of change of pressure can be determined quickly and with substantial accuracy.

While the embodiment of FIG. 5 is illustrated in connection with a closed fluid system, it is also contemplated that the inner chamber 146 or the base chamber 148 can be sealed, while the other is left open to generate an effective altimeter and/or barometer. In other words, a fixed pressure is presented to the one side of the diaphragm while a variable environmental pressure is presented to the other side of the diaphragm, causing the diaphragm to move, either toward or away from the sensing chip. Through appropriate calibration, a predictable and repeatable reading of altitude or surface pressure can be obtained. Similarly, the diaphragm 126 can be located so that a gaseous "relative wind" or moving water flow is passed thereover to read the dynamic pressure of a given flow of gas or water. This enables use of the embodiment of FIG. 5 as a flow meter or air/water speed indicator, since the dynamic pressure applied to the diaphragm and, hence, its movement varies based upon the flow of fluid thereover.

Figure 6:
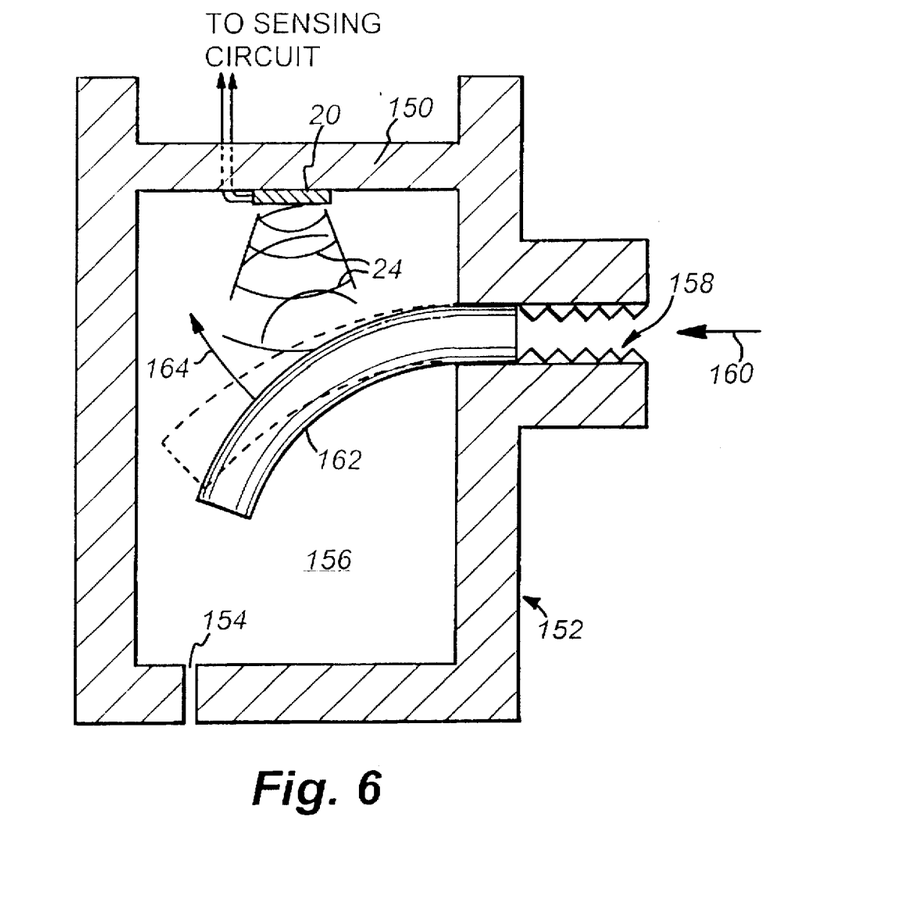
FIG. 6 is a schematic perspective view of a pressure sensing system according to another embodiment of this invention.

FIG. 6 illustrates and alternate embodiment of a pressure sensing system according to this invention. The radar transceiver 20 is mounted on a side wall 150 of a shell 152. The shell 152 can include an inlet port 154 to maintain a given pressure within the inner chamber 156 of the shell 152. In this embodiment, a threaded pipe fitting 158 is provided on the shell 152. The fitting 158 can be connected to a pressure source that exerts pressure (arrow 160) into a sealed tube 162. The sealed tube can be formed from a polymer or resilient metal so that it is normally bent as depicted. As pressure applied to the tube 162 is increased, the tube 162 tends to straighten out (as shown in phantom), moving toward the sensor 20 (arrow 164). Hence, incident waves 24 transmitted by the radar chip 20 reflect differing distances for the tube 162 relative to the chip 20 as pressure varies. This differentiation can be calibrated to obtain a meaningful pressure reading using an appropriate sensing circuit. Rather than a bent tube 162, an alternate embodiment can utilize a linear tube that is free of bends and that swells and contracts to move the tube wall toward and away from the radar chip 20 in response to pressure changes. Note that the use of a tube constructed from a polymer may entail the addition of a radar reflecting material, such as silvering, to ensure an adequate reflected signal since may rubbers and polymers are highly absorptive and/or transparent to radar waves.

Figure 7:
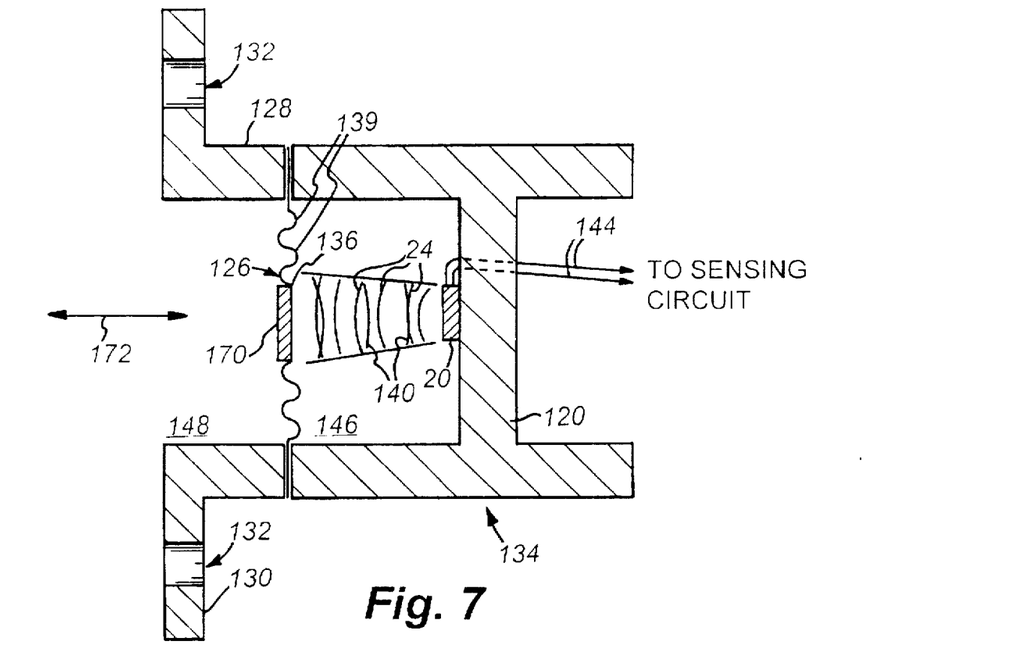
FIG. 7 is a schematic perspective view of an acceleration and vibration sensing system according to one embodiment of this invention.

FIG. 7 illustrates a modification to the pressure sensing diaphragm system of FIG. 5 where components are identical, like numbers to those described with reference to FIG. 5 are utilized. According to the embodiment of FIG. 7, a system for measuring vibrations present in a mechanical system is illustrated. The diaphragm 126 having concentric spring-like undulations 139 is provided on a base member 128. The transceiver chip 20 faces the center section 136 of the diaphragm. It should be clear that any arrangement in which a diaphragm or other spring-like surface is supported in face-to-face relationship with the transceiver chip 20 can be utilized according to this embodiment. The diaphragm center section 136 includes a suitable weight 170. This weight generates an inertia that responds to accelerations experienced by the base 128. It can be tuned, using known harmonic equations to vibrate in response to a predetermined range of expected amplitudes and frequencies of vibrations. Hence, periodic accelerations toward or away from the chip 20 (see double arrow 172) cause the diaphragm's central surface 136 to change its distance relative to the chip 20 generating a reflected wave 140 that indicates displacement of the diaphragm central surface 136. As noted, the surface need not be a diaphragm but rather, any spring structure, including a coil spring or a leaf spring that moves in response to an acceleration and then, substantially, recovers its original position after the acceleration has ended can be substituted. The structure of FIG. 7 can be utilized in connection with any component in which vibration or acceleration must be measured. For example, the structure of FIG. 7 can be applied to a pipe or pump and measure vibration, signaling a warning or flow reduction when vibration exceeds a predetermined maximum amount. Likewise, the structure of FIG. 7 can be used as an accelerometer in inertial guidance systems, airbag deployment systems, braking systems, or any other device in which variable displacement occurs.

Figure 8:
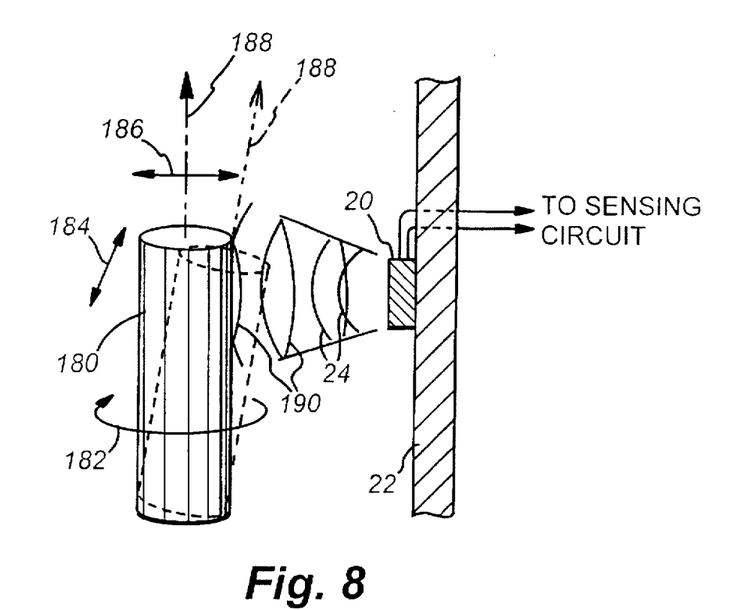
FIG. 8 is a schematic perspective view of a vibration sensing system according to another embodiment of this invention.

Finally, FIG. 8 illustrates a further application of the radar transceiver chip to sense vibration according to this invention. The chip 20 is mounted on a stationary surface 22 that, like other embodiments, can comprise the inner wall of a casing or any other suitable base structure that is generally isolated from movement relative to the part being sensed. A shaft 180 is scanned using incident waves 24. In this embodiment, the shaft has an induced wobble or misalignment (shown in phantom) that occurs periodically as the shaft rotates (curved arrow 182). The wobble can occur transversely (double arrow 184) to the chip 20 and incident waves 24 or toward and away from (double arrow 186) the chip 20 and incident waves 24. The wobble can also be a combination of transverse wobble and wobble toward and away from the chip 20. The wobble results in a displacement of the center of rotation 188 of the shaft 180 and, thus, the outer surface. The displacement is recorded by the reflected waves 190. Appropriate sensing circuitry can be provided in communication with the chip 20 to determine when a given wobble is unacceptable. Hence, the sensor according to this embodiment can be used to sense bearing wear or imminent component failure. The sensed item need not be a shaft but, rather, can be a reciprocating part that must move within a predetermined range. If the part deviates from a predetermined path or range of movement, then the system is alerted to possible malfunction of that part.

Likewise, a sensing chip according to this invention can be used to sense the relative size of a part to determine, for example, if substantial wear has occurred. Additionally, any of the arrangements described in FIGS. 1–8 can be combined using one or more radar transceiver chips to obtain a desired picture of a moving mechanical system.

Accordingly, the foregoing has been a detailed description of certain preferred embodiments. Various modifications and additions can be made to the embodiments described herein without departing from the spirit and scope of this invention. For example, sensing chips can be provided in a variety of packages and can include, formed in their internal circuitry, various specialized sensing circuits adapted to particular applications. Such chips can be formed as application-specific integrated circuits. Hence, this description is meant to be taken only by way of example and not to otherwise limit the scope of the invention.

What is claimed is:

1. A sensor comprising:

a miniaturized radar transceiver microchip mounted on a first surface;

a second surface that is interconnected with a mechanical system having displacement to be sensed, the second surface being constructed and arranged to move relative to the first surface, the second surface being located relative to the miniaturized radar transceiver microchip so that radar waves from the miniaturized radar transceiver microchip are passed between the first surface and the second surface, and the miniaturized radar transceiver microchip generates a sensor signal representative of an amount of movement of the second surface relative to the first surface; and a translating circuit, responsive to the sensor signal, that determines a location of the second surface relative to the first surface so that an operation performed by the second surface can be sensed.

2. The sensor as set forth in claim 1 wherein the second surface comprises a rotating shaft having an irregular surface that passes through the radar waves of the miniaturized radar transceiver microchip as the shaft rotates.

3. The sensor as set forth in claim 2 wherein the irregular surface comprises a repeating undulating surface disposed about at least a part of a perimeter of the shaft.

4. The sensor as set forth in claim 2 wherein the irregular surface comprises an edge that one of increases and decreases substantially continuously about a given portion of the circumference of the shaft.

5. The sensor as set forth in claim 4 wherein the edge defines a cam-shape.

6. The sensor as set forth in claim 2 wherein the irregular surface comprises a gear having a plurality of teeth.

7. The sensor as set forth in claim 1 wherein the second surface comprises a shaft having an axis of elongation and has an irregular surface thereon that passes through the radar waves of the miniaturized radar transceiver microchip as the shaft moves relative to the axis of elongation.

8. The sensor as set forth in claim 7 wherein the irregular surface comprises a surface that varies in distance from the axis of elongation at different points therealong taken along a direction of the axis of elongation.

9. The sensor as set forth in claim 8 wherein the irregular surface comprises a ramped surface.

10. The sensor as set forth in claim 7 wherein the shaft comprises an actuator for a control valve.

11. The sensor as set forth in claim 10 wherein the translating circuit includes a circuit for determining a state of a gate in the valve.

12. The sensor as set forth in claim I wherein the second moving surface comprises a rotating shaft interconnected with a valve gate, the valve gate being actuated by rotation of the shaft.

13. The sensor as set forth in claim 12 wherein the translating circuit includes a circuit for determining a state of a gate in the valve.

14. The sensor as set forth in claim 1 wherein the shaft comprises a continuously rotating shaft interconnected with a source of motive power and wherein the translating circuit includes circuitry for determining at least one of a rotational speed and rotational acceleration of the shaft.

15. The sensor as set forth in claim 1 wherein the second moving surface comprises a diaphragm constructed and arranged to move toward and away from the first surface in response to a force supplied to the diaphragm.

16. The sensor as set forth in claim 15 wherein the force comprises a fluid pressure.

17. The sensor as set forth in claim 15 wherein the diaphragm includes a mass responsive to an applied acceleration thereto constructed and arranged so that the diaphragm moves in response to a predetermined acceleration applied thereto.

18. The sensor as set forth in claim 1 wherein the second surface comprises an enclosure that moves relative to the first surface in response to a predetermined pressure applied thereto.

19. The sensor as set forth in claim 18 wherein the enclosure comprises a tube located adjacent the miniaturized radar transceiver microchip.

20. The sensor as set forth in claim 19 wherein the tube comprises a tube that defines a bent shape at low pressures, the tube being constructed and arranged to move into a more-straightened orientation in response to increased pressures applied thereinto.

21. The sensor as set forth in claim 1 wherein the second surface is mounted so that at least a portion of it moves toward and away from the miniaturized radar transceiver microchip at predetermined times and wherein the translation circuit includes a circuit for determining when a predetermined level of vibration has occurred within the second surface.

22. The sensor as set forth in claim 21 wherein the second surface comprises a rotating shaft and wherein the translating circuit includes a circuit for determining when a predetermined maximum amount of wobble in the shaft has occurred.

23. An axial translation sensor comprising:

a fixed surface having a miniaturized radar transceiver microchip mounted thereon;

a moving surface that moves along an axial direction relative to the fixed surface and including an irregular surface shape along at least a portion thereof in communication with the miniaturized radar transceiver microchip, so that radar waves from the miniaturized radar transceiver microchip are passed between the fixed surface and the moving surface, and the miniaturized radar transceiver microchip generates a sensor signal representative of an amount of axial translation of the moving surface relative to the fixed surface; and circuitry, responsive to the sensor signal, for determining axial translation based upon movement of the irregular surface shape relative to the miniaturized radar transceiver microchip.

24. The axial translation sensor as set forth in claim 23 wherein the moving surface comprises a linear actuator.

25. The axial translation sensor as set forth in claim 24 wherein the linear actuator is interconnected with a valve.

26. A rotational sensor comprising:

a rotationally fixed surface having a miniaturized radar transceiver microchip mounted thereon;

a rotationally moving surface having an irregular surface shape thereon positioned relative to the radar transceiver microchip and having a surface that varies about at least a portion of a perimeter of the rotating surface, so that radar waves from the miniaturized radar transceiver microchip are passed between the fixed surface and the moving surface, and the miniaturized radar transceiver microchip generates a sensor signal representative of an amount of rotational displacement of the moving surface relative to the fixed surface; and a translating circuit, responsive to the sensor signal, for determining a rotational displacement of the moving surface relative to the fixed surface.

27. The rotational sensor as set forth in claim 26 wherein the rotating surface comprises a rotating actuator shaft.

28. The rotational sensor as set forth in claim 27 wherein the rotating actuator shaft is interconnected with a rotationally actuated valve.

29. The rotational sensor as set forth in claim 26 wherein the surface shape comprises a cam shape.

30. A pressure sensor comprising:

a miniaturized radar transceiver microchip mounted to transmit radar waves between a fixed surface and a moving surface, the moving surface being in communication with a fluid so that variation in a pressure of the fluid causes movement of the moving surface relative to the fixed surface, so that radar waves from the miniaturized radar transceiver microchip are passed between the fixed surface and the moving surface, and the miniaturized radar transceiver microchip generates a sensor signal representative of an amount of movement of the moving surface relative to the fixed surface; and a translating circuit, responsive to the sensor signal, that determines the pressure of the fluid based upon a relative movement of the moving surface relative to the fixed surface.

31. The pressure sensor as set forth in claim 30 wherein the moving surface comprises a diaphragm having a relatively thin wall.

32. The pressure sensor as set forth in claim 31 wherein the wall includes a plurality of undulations constructed and arranged to increase displacement of the diaphragm in response to a fluid pressure applied thereto.

33. The pressure sensor as set forth in claim 30 wherein the moving surface comprises a sealed tube having a first shape and a second shape, constructed and arranged to move between the first shape and the second shape in response to increased fluid pressure applied thereinto.

34. A vibration sensor comprising:

a fixed surface having a miniaturized radar transceiver microchip mounted thereto;

a moving surface having a predetermined mass constructed and arranged to move in response to a predetermined amplitude and frequency of vibration applied thereto, so that radar waves from the miniaturized radar transceiver microchip are passed between the fixed surface and the moving surface, and the miniaturized radar transceiver microchip generates a sensor signal representative of an amount of movement of the moving surface relative to the fixed surface; and a translating circuit, responsive to the sensor signal, for determining a level of vibration in the moving surface.

35. The vibration sensor as set forth in claim 34 wherein the moving surface comprises a relatively-thin-walled plate having a mass mounted upon at least a portion thereof.

36. A method for sensing movement of a mechanical system comprising:

providing a fixed surface and locating a miniaturized radar transceiver microchip relative to the fixed surface;

said miniaturized radar transceiver microchip transmitting a radar beam between the fixed surface and a moving surface that is interconnected with the mechanical system;

said miniaturized radar transceiver microchip receiving a reflected radar beam indicative of an amount of movement of the moving surface; and determining a degree of movement in the mechanical system in response to the reflected radar beam.

37. The method as set forth in claim 36 further comprising moving the moving surface in response to an applied pressure from a fluid.

38. The method as set forth in claim 36 further comprising moving the moving surface in response to an mechanical vibration.

39. The method as set forth in claim 38 wherein the step of moving includes rotating a shaft and wherein the step of determining includes determining a wobble in the rotating shaft.

40. The method as set forth in claim 36 further comprising moving the moving surface about an axis of rotation and passing an irregular surface on the moving surface through a transmitted beam of the miniaturized radar transceiver microchip.

41. The method as set forth in claim 36 further comprising moving the moving surface linearly and passing an irregular surface through a transmitted beam of the miniaturized radar transceiver microchip.

42. The method as set forth in claim 36 wherein the step of determining includes determining a relative position of the moving surface and thereby determining a state of operation of the mechanical system interconnected with the moving surface.

43. A method for sensing actuation of a valve comprising:

providing a valve casing;

locating a miniaturized radar transceiver microchip relative to a fixed portion of the valve casing;

directing a transmitted beam from the miniaturized radar transceiver microchip between a moving component on the valve casing and the fixed portion; and determining a position of the moving component based upon a reflected beam received by the miniaturized radar transceiver microchip.

* * * * *